United States Patent
Lacombe et al.

(10) Patent No.: US 7,636,873 B2
(45) Date of Patent: Dec. 22, 2009

(54) ENHANCEMENT OF ASSURED EVENT DELIVERY MECHANISM TO ELIMINATE EXTERNAL XA STORE REQUIREMENT

(75) Inventors: Jason Nathaniel Lacombe, Berkeley, CA (US); Travis Eli Nelson, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 11/532,381

(22) Filed: Sep. 15, 2006

(65) Prior Publication Data

US 2008/0127219 A1    May 29, 2008

(51) Int. Cl.
    *G06F 11/00*    (2006.01)
(52) U.S. Cl. .............................. 714/47; 714/4; 709/203; 719/318
(58) Field of Classification Search ................. 714/4, 714/47; 709/203; 719/318
    See application file for complete search history.

(56) References Cited

U.S. PATENT DOCUMENTS

| 5,493,682 | A | 2/1996 | Tyra et al. |
| 6,094,688 | A | 7/2000 | Mellen-Garnett et al. |
| 6,507,875 | B1 | 1/2003 | Mellen-Garnett et al. |
| 2003/0093471 | A1* | 5/2003 | Upton ........................ 709/203 |
| 2004/0034859 | A1 | 2/2004 | Potter et al. |
| 2004/0215715 | A1* | 10/2004 | Ehrich et al. ................ 709/203 |

OTHER PUBLICATIONS

U.S. Appl. No. 11/149,652, filed Apr. 26, 2005, Lacombe et al.
Pardyak et al., "Dynamic Binding for an Extensible System", Second Symposium on Operating Systems Design and Implementation, Operating Systems Review, vol. 30, 1996, pp. 201-212.
Ching, Business Transaction Assurance in Business Service Networks, ACM Digital Library, 2004, pp. 1-6.
Hanemann at al., "Assured Service Quality by Improved Fault Management", ICSOC'04, ACM Digital Library, 2004, pp. 183-192.
Seifert at al., "Processing Read-Only Transactions in Hybrid Data Delivery Environments with Consistency and Currency Guarantees", Mobile Networks and Applications, vol. 8, 2003, Kluwer Academic Publishers, pp. 327-342.
Wu et al., "Technology Adaptation: The Case of Implementing a Collaborative Product Commerce System to New Product Design", ICEC'05, Aug. 15-17, Xi'an China, ACM Digital Library, pp. 674-680.

\* cited by examiner

*Primary Examiner*—Robert Beausoliel
*Assistant Examiner*—Charles Ehne
(74) *Attorney, Agent, or Firm*—Yee & Associates, P.C.; Prentiss W. Johnson

(57) ABSTRACT

Aspects of the present invention provide a method, system, computer usable program code, and computer implemented method for assured event delivery in an enterprise information system. The method comprises mapping the capabilities of the enterprise information system onto an interface, wherein the mapping allows the enterprise information system to be used in global transactions.

9 Claims, 6 Drawing Sheets

*FIG. 3*
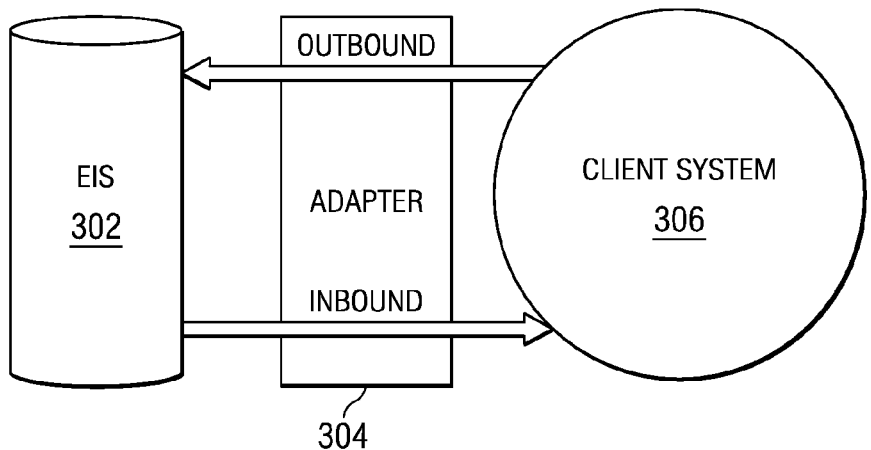
*FIG. 4*
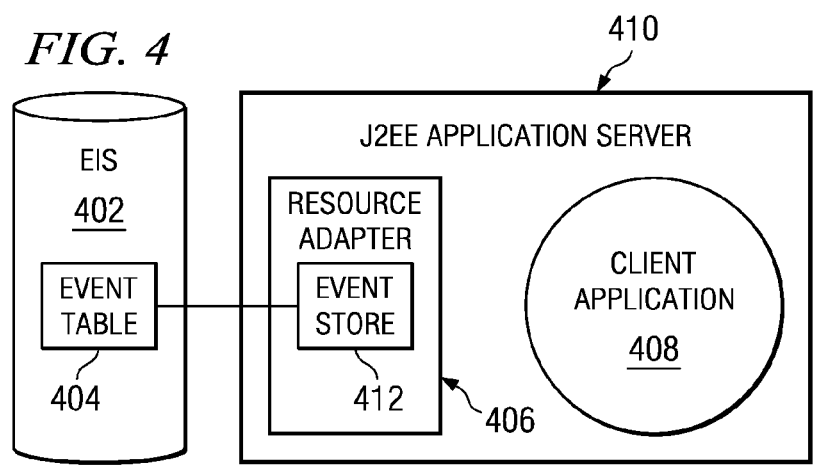
*FIG. 5*
```
public interface XAAssociation {
public void setEventTransactionID (Event event,Xid xid);
public XID[]get PendingTransactions();
public Event getEventForXid (Xid xid);
}
```

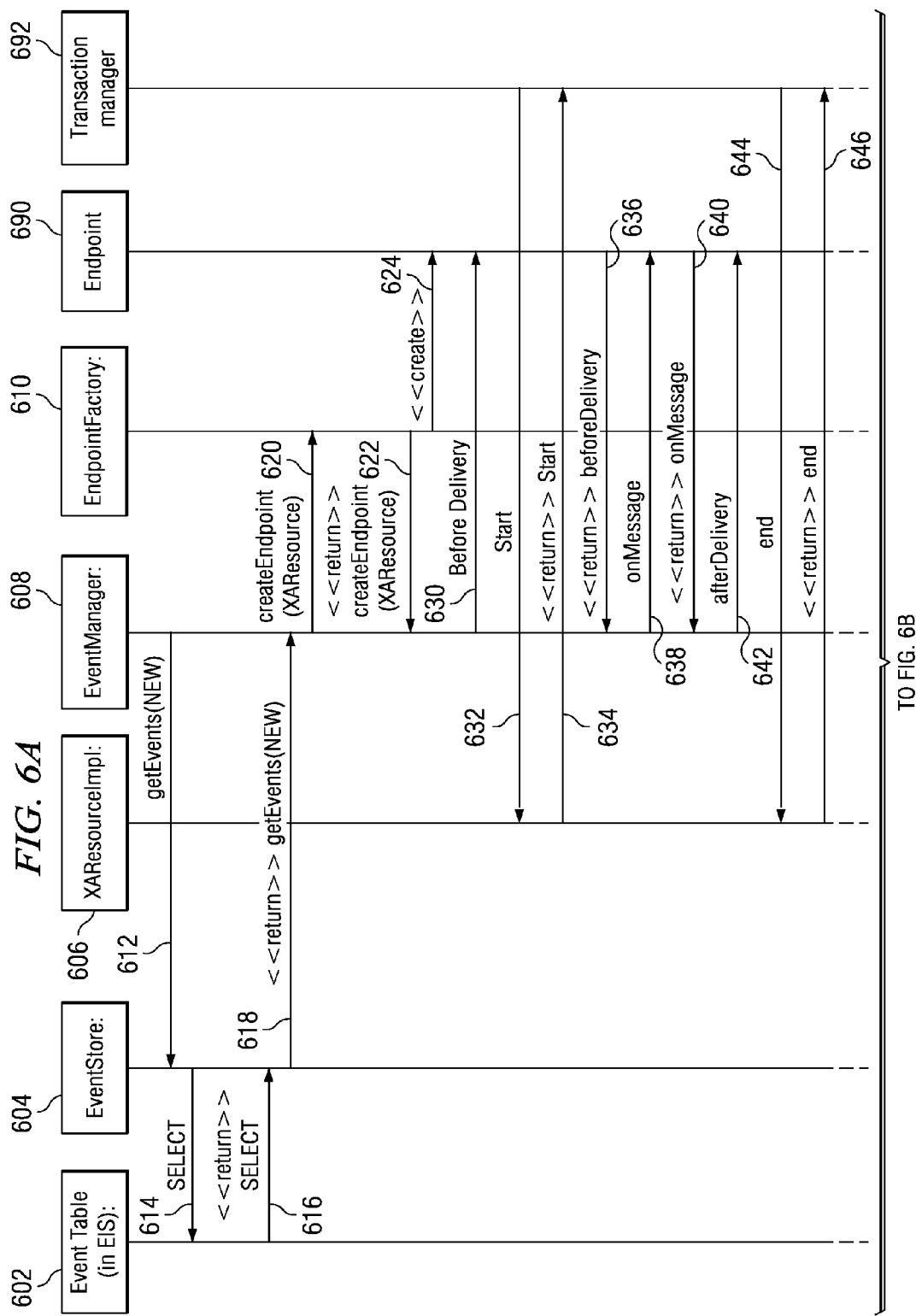

FIG. 7
EVENT TABLE 700
| EventID | ObjectName | Operation/Verb | XID | Status |
|---|---|---|---|---|
| 0001 | Customer | Create | | New |
| 0001 | Customer | Create | 0001-231 | New |
| 0001 | Customer | Create | 0001-231 | Commited |
| | | | | |
702 — 704 — 706 — 708
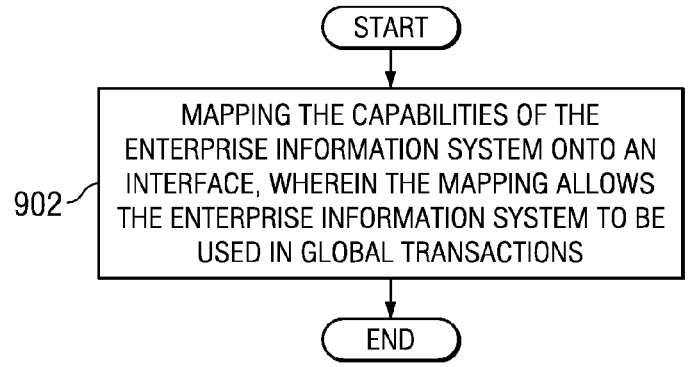
FIG. 9
START → 902: MAPPING THE CAPABILITIES OF THE ENTERPRISE INFORMATION SYSTEM ONTO AN INTERFACE, WHEREIN THE MAPPING ALLOWS THE ENTERPRISE INFORMATION SYSTEM TO BE USED IN GLOBAL TRANSACTIONS → END
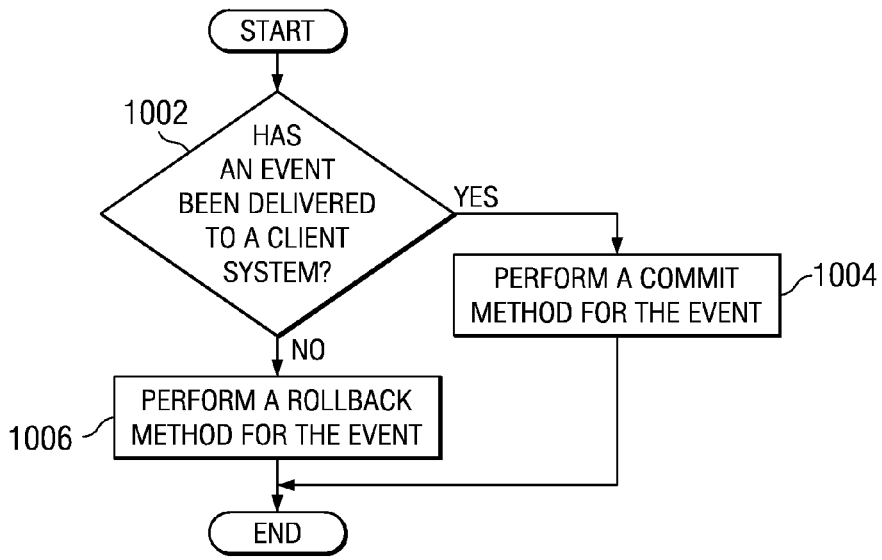
FIG. 10

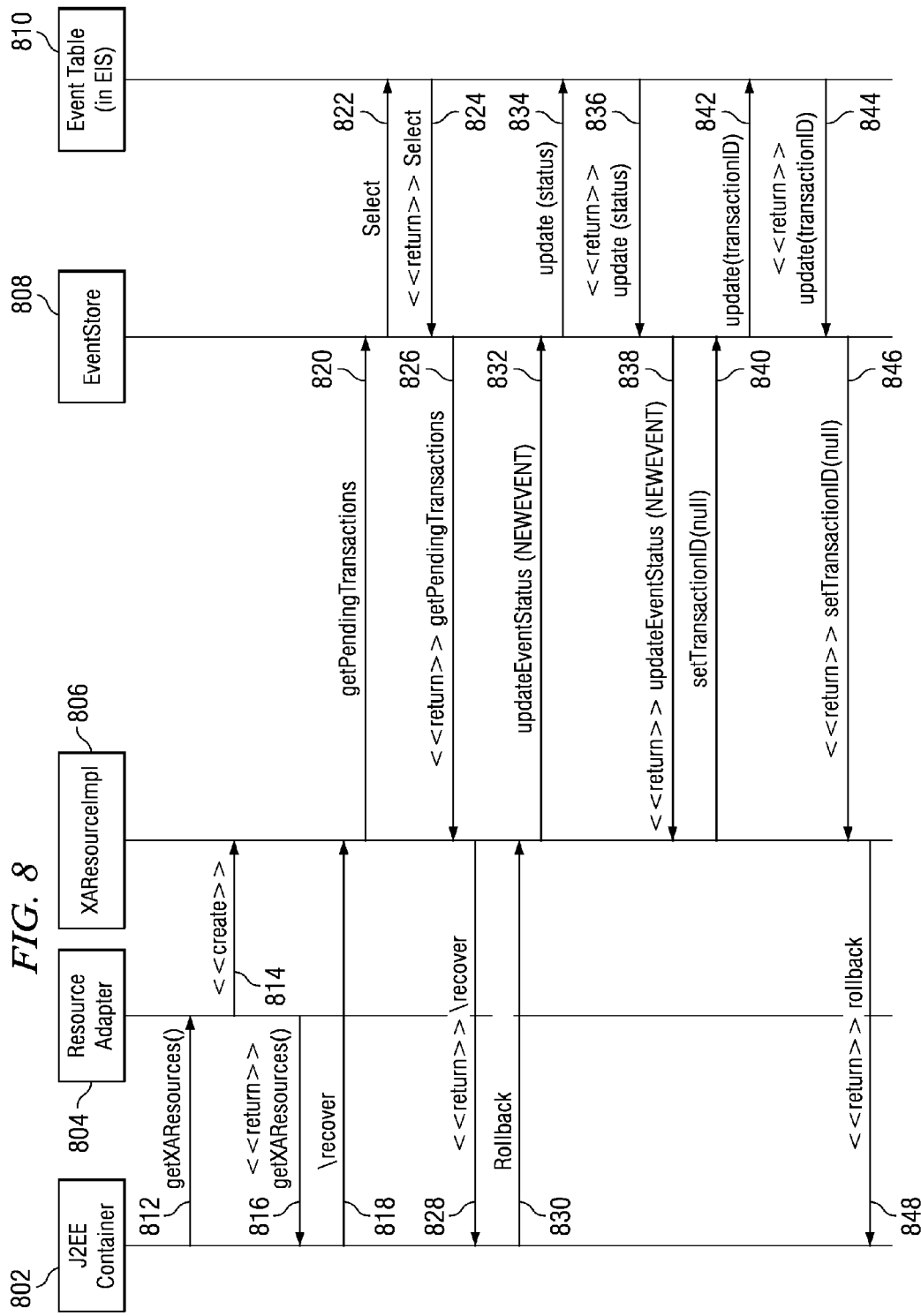

ENHANCEMENT OF ASSURED EVENT DELIVERY MECHANISM TO ELIMINATE EXTERNAL XA STORE REQUIREMENT

BACKGROUND OF THE INVENTION

1. Field of the Invention

The present invention relates generally to a data processing system. More specifically, the present invention relates to enterprise information systems and an enhancement of assured event delivery for enterprise information systems.

2. Description of the Related Art

Adapters allow business events to flow from an Enterprise Information System (EIS) to a listening client such as a business process or other application. An Enterprise Information System is an application that stores data that is used for business systems. An event is a change that has occurred within the Enterprise Information System that also needs to be propagated into another system. Therefore, an event serves as a marker for what has changed. The Java 2 Enterprise Edition (J2EE) standard defines a standard approach to building these adapters outlined in the J2EE Connector Architecture (JCA) specification.

One aspect that is critical to adapter development is "assured event delivery." Assured event delivery means that business events from the EIS flow to the client with the assurance that they will be delivered once and only once. Without assured event delivery, the integrity of the business data or process can be corrupted due to, for example, an account being de-bitted more than once or not at all. One means that is often employed to provide assured event delivery is the use of transactions. The J2EE Connector Architecture supports delivery of events in the context of XA transactions. XA transactions are global transactions. A global transaction means that there are two or more systems participating in one operation, which will either succeed or fail. There is no interim state for a global transaction. The XA specification is published by The Open Group. The XA specification is also known as the X/Open Distributed Transaction Processing Model.

The difficulty with XA transactions is that exposing support for XA transactions generally requires the EIS to inherently support XA transactions, which, unfortunately, very few EIS systems do. One solution to the problem of supporting XA transactions and subsequently assured event delivery is to stage the events in an XA compliant data store. However, the use of an XA compliant data store to stage the events increases the number of components necessary to support assured event delivery. In turn, increased component usage increases the, potential for error, the overhead for running multiple components, and the complexity of administration of the system. Additionally, the data is not as easily viewed and managed. Therefore, it would be desirable to be able to properly map the capabilities of the EIS onto the XA interface in such a way that the EIS can be enlisted in an XA transaction.

SUMMARY OF THE INVENTION

Exemplary embodiments provide a method, system, computer usable program code, and computer implemented method for assured event delivery in an enterprise information system. The method comprises mapping the capabilities of the enterprise information system onto an interface, wherein the mapping allows the enterprise information system to be used in global transactions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of an information flow between an EIS system and a client system;

FIG. 4 is a block diagram of a system for delivering business events from an EIS system to a client system according to an illustrative embodiment;

FIG. 5 is an example of code for creating an XAAssociation interface according to an illustrative embodiment;

FIGS. 6A and 6B are diagrams depicting an information flow for polling between an EIS system and a client system according to an illustrative embodiment;

FIG. 7 is a block diagram showing information stored in an event table according to an illustrative embodiment;

FIG. 8 is a diagram depicting an information flow for crash recovery according to an illustrative embodiment;

FIG. 9 is a flowchart illustrating the operation of assured event delivery according to an illustrative embodiment; and FIG. 10 is flowchart illustrating recovery in the case of a crash for assured event delivery.

DETAILED DESCRIPTION OF THE PREFERRED EMBODIMENT

Figure 1:
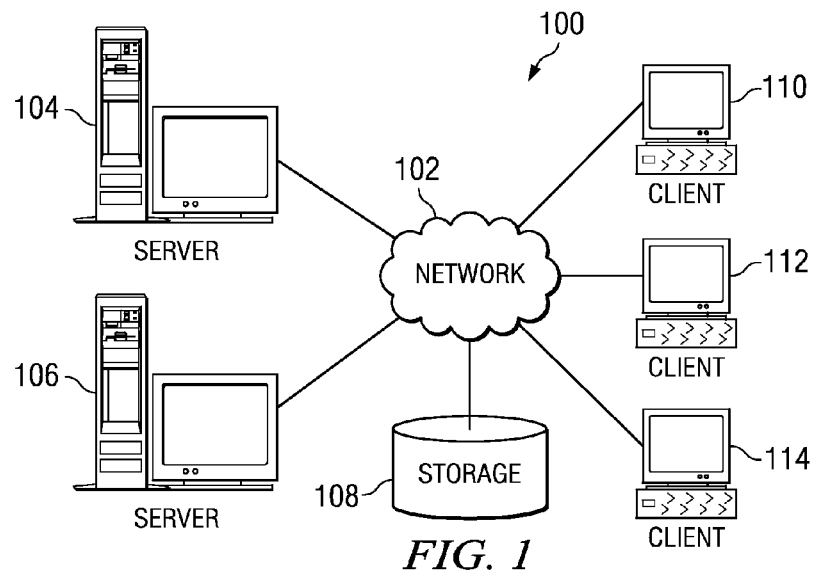
FIG. 1 is a pictorial representation of a network of data processing systems in which exemplary aspects may be implemented.
Figure 2:
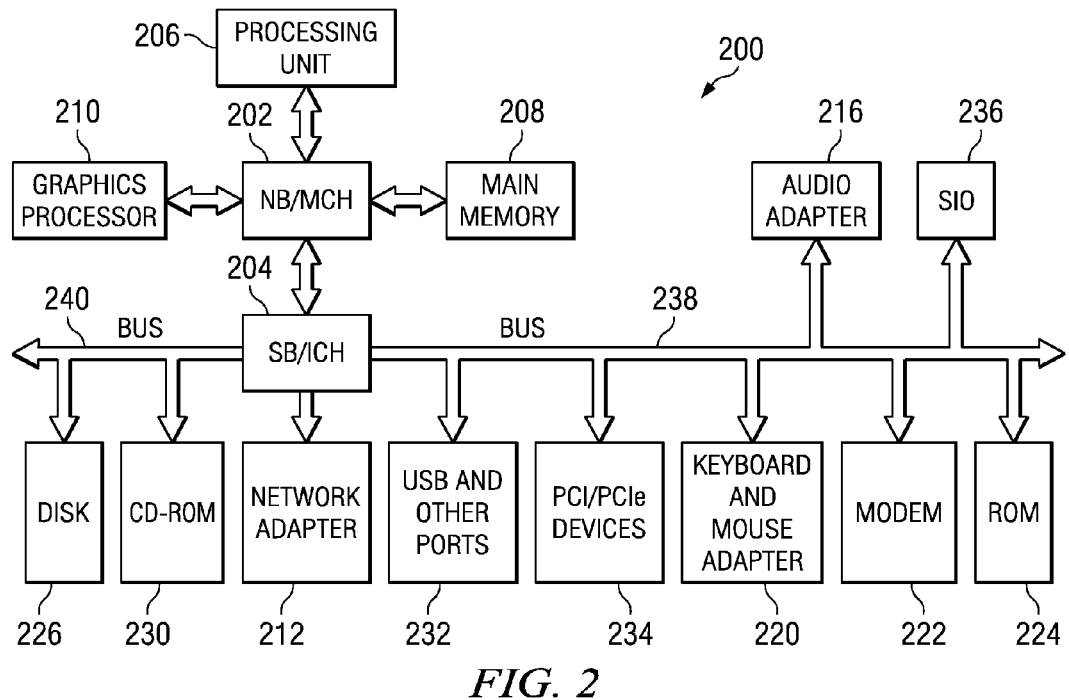
FIG. 2 is a block diagram of a data processing system in which exemplary aspects may be implemented.

FIGS. 1-2 are provided as exemplary diagrams of data processing environments in which exemplary embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope.

With reference now to the figures, FIG. 1 depicts a pictorial representation of a network of data processing systems in which aspects may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

FIG. 3 is a block diagram of an information flow between an EIS system and a client system. Building connectivity between EISs, such as EIS 302, and client systems, such as client system 306, either for the purpose of synchronizing the data therein or for building new systems that access others, requires a certain amount of processing logic. Both EIS 302 and client system 306 may be implemented as a data processing system such as data processing system 200 in FIG. 2, which is part of a data processing system, such as network 100 in FIG. 1. Often the processing logic is contained in a specialized piece of code called an adapter, such as adapter 304.

An adapter enables bi-directional communication with an EIS. The adapter allows clients to perform operations inside the EIS, such as querying or modifying data, which is referred to as outbound communication. The adapter also enables clients to receive data from or be made aware of events in the EIS, which is referred to as inbound communication. The inbound communication typically contains information about business data that has been created or changed inside the EIS, which is referred to as "events." Many EIS systems do not have the capability to detect and publish such events. Thus, for these situations, most adapters will actively poll the EIS to detect and report any changes.

An adapter may implement "polling" to deliver the business events from the EIS system to the client. In this case, the EIS will have an "event table" inside its schema that stores information about the business events to be published. This event table contains such information as the type of the object in the EIS that was modified, how it was modified, and the key of the object so that it can be retrieved at a later point. When an object is modified inside the EIS, a "trigger" or other workflow mechanism will detect that a change has occurred, and write a record into the event table.

FIG. 4 is a block diagram of a system for delivering business events from an EIS system to a client system according to an illustrative embodiment. EIS 402, which may be implemented as a data processing system such as data processing system 200 in FIG. 2, comprises event table 404. Resource adapter 406 and client application 408 are part of J2EE application server 410. EventStore 412 is an interface that may be implemented by an adapter developer to translate common polling functions, such as the retrieval of events and the setting of event status, for example, into EIS-specific calls for resource adapter 406. An interface means an interface as defined in the Java language. A resource adapter is defined as part of the J2EE specification. A resource adapter is the component that communicates with an external system; typically the system is a back-end system.

In order to properly map the capabilities of the EIS onto the XA interface in such a way that the EIS can be enlisted in an XA transaction, EventStore 412 should associate a transaction identity in the XA specification (XID) with an event in the EventStore database. Mapping means translating both data and the sequence of calls that one system uses into data and another sequence of calls that another system expects. The capabilities referred to are the storage and retrieval of data. The application program interfaces (APIs) for every EIS system are different. Therefore, the interface, EventStore 412, is implemented in such a way as to call the API to store and retrieve the data that is necessary to participate in the transaction. Implement means implement as defined by the Java language. EventStore 412 should be able to query for an event by the given XID. Presumably, the XID and the event are stored on the same row of the EventStore's database, although this is not essential, depending upon the particular implementation.

An XID is an interface that represents a transaction identity in the XA specification. The XID contains two parts, a global identity and a branch identity. A unique transaction identity for a transaction is formed by the conjunction of the global identity with the branch identity. Both the global identity and the branch identity are byte arrays with up to 64 bytes in each array. Both of these arrays should be stored in an event table. However, any particular event table may be implemented with different encoding, and may or may not be able to store an arbitrary array of bytes. An arbitrary EIS usually will allow the storing of a string, with the caveat that only valid characters are present in the EIS's current codepage. Additionally an encoding algorithm exists, called Base64, which can convert an arbitrary array of bytes into a string that is valid on any known codepage. Thus, this encoding algorithm may be used to convert the XID from the array of bytes into a Base64 format and store the XID inside the EIS event table. The Base64 format is a data encoding scheme whereby binary-encoded data is converted to printable ASCII characters.

To facilitate this, an exemplary embodiment of the present invention provides for an XID implementation that includes "getter" and "setter" methods for the transaction branch and global transaction ID that provide access to those fields in Base64 format. An XID normally contains "getter" and "setter" methods for the global identity and the branch identity that accept and return byte arrays. The translation of byte arrays to Base64-encoded and vice versa is designed to integrate with the XA specification seamlessly. The XID implementation contains a constructor that accepts a String parameter in Base64 format, and allows the consumer of the XID object to obtain the byte array representations via the byte array getters and setters. Likewise, if the consumer of the XID object were to set the XID with the byte array getters and setters, they could obtain the Base64 representation of this XID by calling "toString" on the XID object, or by using special Base64 "getters" and "setters". For example, to obtain the Base64 representation of the global transaction identification, the method "getBase64GlobalTransationID" can be used. The XID implementation calls out to existing implementations of the Base64 encoding algorithm when a conversion between the byte array and Base64 formats is necessary.

A developer building an adapter, such as resource adapter 406 in FIG. 4, will need to implement a new interface, called XAAssociation, in addition to the usual EventStore methods. The XAAssociation interface is an interface that maps the EIS capabilities for storing data onto the requirements of the adapter to store transaction information in the Event table in the EIS. An adapter writer will implement this interface by calling the EIS application program interfaces (APIs) in the appropriate way to store and retrieve the necessary data.

FIG. 5 is an example of code for creating a XAAssociation interface according to an illustrative embodiment. The code provided in FIG. 5:

```
public interface XAAssociation {
    public void setEventTransactionID(Event event, Xid xid);
    public Xid[ ] getPendingTransactions( );
    public Event getEventForXid(Xid xid);
    public void close( );
}
``` has been presented for purposes of illustration as an exemplary implementation of the XAAssociation interface, and is not intended to be exhaustive or to limit the present invention to the form disclosed.

Figure 6B:
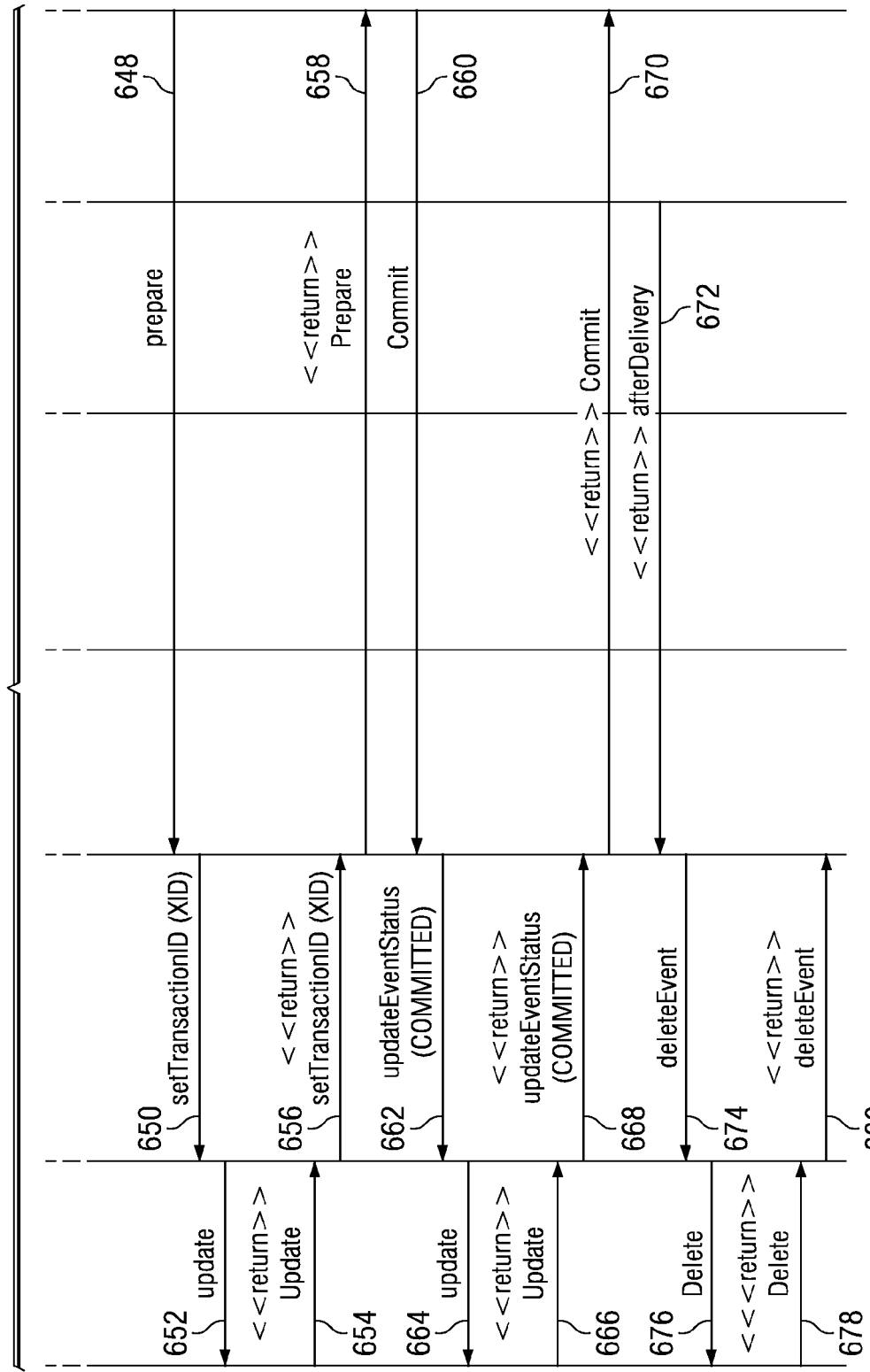

FIGS. 6A and 6B are diagrams depicting an information flow for polling between an EIS system and a client system according to an illustrative embodiment. The first step in polling is to get the new events. EventManager 608 sends a request, getEvents(NEW) to EventStore 604 (step 612). EventStore 604 queries Event table 602 to select the new events (step 614). Event table 602 returns the selected events to EventStore 604 (step 616). EventStore 604 then returns the new events to EventManager 608 (step 618). EventManager 608 then creates a reference to the client via EndpointFactory 610 instance, Endpoint 690, by calling "createEndpoint" on EndpointFactory 610 (steps 620, 622, and 624). When making this call, EventManager 608 can optionally pass an XAResource instance that enables the adapter container, the component which manages the adapter, to access and control the XA transactions required for assured event delivery. In this scenario, EventManager 608 passes a custom XAResource implementation which contains the key functionality of properly mapping the capabilities of the EIS on the XA interface. The XA implementation will call the EventStore's methods as defined in the XAAssociation interface, to update the Event table as the XA protocol is executed.

Once this custom XAResource implementation is handed to the adapter container, EventManager 608 calls "beforeDelivery" on Endpoint 690 to tell transaction manager 692, which resides inside the application server, that a transaction should start at this point (steps 630 and 636). Transaction manager 692 then calls "start" on XAResource implementation 606 (steps 632 and 634). EventManager 608 delivers the event, via the on Message call, to Endpoint 690 (steps 638 and 640). Then EventManager 608 calls "afterDelivery" on the endpoint (steps 642 and 670) to signal that the delivery is complete from the adapter's perspective. Once the adapter signals that delivery has been completed, transaction manager 692 will then call "end" (steps 644 and 646), "prepare" (steps 648, and 658), and "commit" (steps 660, and 672) to complete the requirements outlined in the XA transaction protocol.

When this "prepare" call happens, XAResourceImpl 606 will call "setTransactionID" on EventStore 604 (steps 650 and 656). EventStore 604 will store the transaction XID in Event table 602 (steps 652 and 654). When the "commit" call happens, XAResourceImpl 606 will call "updateEventStatus" on EventStore 604 (steps 662 and 668) to set the status in Event table 602 to "COMMITED" (steps 664 and 666). This is done for every event that was retrieved. After all events have been delivered and successfully marked "COMMITTED", EventManager 608 calls "deleteEvent" on EventStore 604 (steps 674 and 680) to remove the record of the event from Event table 602 (steps 676 and 678).

FIG. 7 is a block diagram showing information stored in an event table according to an illustrative embodiment. Event Table 700 has 5 columns, an Event ID column, an Objectname column, an Operation/Verb column, an XID column, and a Status column. Event table 700 shows the structure after various operations in FIGS. 6A and 6B are performed. Line 702 shows the structure of an event table, table 700, upon polling. The Event ID is 001. The object name is Customer. The Operation/Verb is create. There is no XID at this time and the status is new. Line 704 shows the status of the table immediately after the prepare call by the transaction manager on the XAResource in FIGS. 6A and 6B. At this point, XID 0001-231 has been assigned to the event. Line 706 shows the status of the table immediately after the commit call by the transaction manager on the XAResource in FIG. 6B. Line 708 shows the status of the table post delivery in an implicit transaction, the event has been deleted.

At any point in the process described in FIGS. 6A and 6B, the application server or hardware could crash. Being able to detect which events have been delivered and which have not been delivered allows the transaction manager to determine the state of transactions that were in progress at the time of the crash. This determination enables the transaction manager to be able to inform the adapter as to which events need to be redelivered.

The process by which this determination occurs is shown in FIG. 8. FIG. 8 is a diagram depicting an information flow for crash recovery according to an illustrative embodiment. When the application server re-starts, J2EE container 802 will call "getXAResources" on Resource Adapter 804 (step 812). Resource Adapter 804 the creates XAResourceImpl 806 (step 814). For each endpoint, as indicated by a unique ActivationSpec per the JCA specification, Resource Adapter 804 will return XAResourceImpl 806 instances to J2EE container 802 (step 816). The transaction manager employed by J2EE container 802 will then perform a "recovery scan" on the XAResourceImpl 806 and request the XIDs of any events for which a transaction had been previously started but not committed due to the failure (steps 818 and 828). Per the XA protocol, an XAResource needs to implement the "recover" method, which should return any XIDs in the "prepared" state. The recovery scan is a series of calls that allows the transaction manager to set any of these transactions to a committed or rolled back state.

During the recovery scan, XAResourceImpl 806 calls "getPendingTransactions" on EventStore 808 (steps 820 and 826). EventStore 808 will select the pending transactions in Event table 810 (steps 822 and 824). The transaction manager in J2EE container 802 will then call either a "rollback" or a "commit" method on XAResourceImpl 806, and Resource Adapter 804 will behave accordingly. "Rollback" tells the adapter that the transaction was not completed; to the adapter, that means that the event was not delivered. "Commit" tells the adapter that the transaction was completed, and the event was delivered. If a rollback method is requested for the event, the transaction manager in J2EE container 802 will then call rollback method on XAResourceImpl 806 (steps 830 and 848). Resource Adapter 804 will set the event status to "NEW" and disassociate the transaction identification in the event table. XAResourceImpl 806 calls "updateEventStatus" on EventStore 808 (steps 832 and 838). This causes EventStore 808 to update the status of each event in Event table 810 to "New" (steps 834 and 836). XAResourceImpl 806 then gets rid of the old transaction identification by calling "setTransactionID" on EventStore 808, with the transaction identification set to null (steps 840 and 846). EventStore 808 then updates the transaction identification in Event table 810 (steps 842 and 844). When the event is sent again, a new transaction identification will be associated with the event. If a commit method is requested for the event, the adapter will set the event status to "COMMITTED" and eventually delete the event.

In another exemplary embodiment, a configuration property could be provided to inform the adapter whether or not to store the transaction IDs in the event table. If the user chooses not to do this, the user will experience better performance but will not have the "once and only once" delivery assurance. If transaction IDs are not stored, any existing events would be re-delivered during failure recovery and, subsequently, a client may receive some duplicate events.

FIG. 9 is a flowchart illustrating the operation of assured event delivery according to an illustrative embodiment. The process in FIG. 9 may be implemented in a data processing system, such as data processing system 200 in FIG. 2. The operation begins by mapping the capabilities of the enterprise information system onto an interface, wherein the mapping allows the enterprise information system to be used in global transactions (step 902) and the operation ends. The interface associates a unique transaction identity with an event. The unique transaction identity is comprised of two parts, a global identity and a branch identity. In a particular implementation, the global identity and the branch identity are byte arrays. In another implementation, the byte arrays are converted into a format for storage in an event table. In another implementation, the format for storage is the Base64 format.

FIG. 10 is flowchart illustrating recovery in the case of a crash for assured event delivery. The operation begins after a crash has occurred. The process in FIG. 10 may be implemented in a data processing system, such as data processing system 200 in FIG. 2. The operation determines if an event has been delivered to a client system (step 1002). If the operation determines that an event has been delivered to a client system (a yes output to step 1002), the operation performs a commit method for the event (step 1004) and the operation ends. If the operation determines that an event has not been delivered to a client system (a no output to step 1002), the operations performs a rollback method for the event (step 1006) and the operation ends.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for assured event delivery in an enterprise information system, the computer implemented method comprising:
    mapping capabilities of the enterprise information system onto an interface, wherein the mapping allows the enterprise information system to be used in global transactions, wherein the interface is an interface for a resource adapter, wherein the interface associates a unique transaction identity with an event, and wherein the event is a change that has occurred within the enterprise information system to be propagated into another system;
    polling between the enterprise information system and a client system, wherein the polling delivers a set of events;
    determining whether the event has been delivered to the client system;
    responsive to the event having been delivered to the client system, performing a commit method for the event, wherein the commit method informs the resource adapter that the event was delivered; and
    responsive to the event failing to be delivered to the client system, performing a rollback method for the event, wherein the rollback method informs the resource adapter that the transaction was not completed.

2. The computer implemented method of claim 1, wherein the unique transaction identity comprises:
    a global identity; and
    a branch identity.

3. The computer implemented method of claim 2, wherein the global identity and the branch identity are byte arrays, further comprising:
    converting the global identity and the branch identity byte arrays into a format for storage in an event table; wherein the event table is stored by the enterprise information system; and
    storing the converted global identity and the branch identity into the event table.

4. The computer implemented method of claim 1, further comprising:
    in response to an application server restarting after a crash, a Java 2 Enterprise Edition ("J2EE") container, with a transaction manager, performing a recovery process, the recovery process further comprising:
    creating an instance of a transaction resource;
    returning the instance of the transaction resource to the J2EE container;
    performing a recovery scan on the instance of the transaction resource; wherein the instance of the transaction resource receives a pending transaction; wherein the recovery scan enables the transaction manager to set the pending transaction to a commit state or a rollback state; wherein the commit state informs the resource adapter that the event was delivered to the client system; and wherein the rollback state informs the resource adapter that the pending transaction failed to be delivered to the client system;
    responsive to the transaction manager setting the pending transaction to the rollback state, calling a rollback method on the instance of the transaction resource; wherein the resource adapter sets a event status to new and disassociates a transaction identification in the event table; wherein the event table is stored by the enterprise information system; wherein the instance of the transaction resource updates the event status using an event store service; wherein the event store service updates the status of the pending transaction in the event table to new; wherein the instance of the transaction resource calls on the event store service to set the transaction identification to null; wherein the event store service updates the transaction identification in the event table; wherein a new transaction identification is associated with the event; and
    responsive to the transaction manager setting the pending transaction to the commit state, deleting the event.

5. The computer implemented method of claim 1, wherein the polling step further comprising:
    requesting, by an event manager, a set of new events from an event store service;
    selecting, by the event store service, the set of new events located in an event table, wherein the event table is stored by the enterprise information system;
    returning the set of new events to the event manager;
    creating, by the event manager, a reference to a client;
    creating an instance of a custom transaction resource implementation for the reference;

responsive to the creating the instance of the custom transaction resource implementation, the event manager notifying the reference before delivery;

starting the instance of the custom transaction resource implementation, by the event manager;

delivering the event to the reference;

notifying the reference after the event has been delivered;

ending the transaction by performing a prepare step and a commit step;

responsive to performing the prepare step, the instance of the custom transaction resource implementation setting a transaction identification on the event store service; wherein the event store service stores the transaction identification in the event table;

responsive to performing the commit step, the instance of the custom transaction resource implementation updating an event status on the event store service to set the status in the event table to a committed state;

responsive to the event status being set to the committed state, the event manager requesting the event store service to delete the event in the event table; and deleting the event in the event table.

6. A computer program product stored on a recordable-type computer usable medium configured for assured event delivery in an enterprise information system, the computer program product comprising:

computer useable program code for mapping capabilities of the enterprise information system onto an interface, wherein the mapping allows the enterprise information system to be used in global transactions, wherein the interface is an interface for a resource adapter, wherein the interface associates a unique transaction identity with an event, and wherein the event is a change that has occurred within the enterprise information system to be propagated into another system;

computer useable program code for polling between the enterprise information system and a client system, wherein the polling delivers a set of events;

computer useable program code for determining whether the event has been delivered to the client system;

computer useable program code for performing a commit method for the event in response to the event having been delivered to the client system, wherein the commit method informs the resource adapter that the event was delivered; and computer useable program code for performing a rollback method for the event in response to the event failing to be delivered to the client system, wherein the rollback method informs the resource adapter that the transaction was not completed.

7. The computer program product of claim 6, wherein the unique transaction identity comprises:

a global identity; and a branch identity.

8. The computer program product of claim 7, wherein the global identity and the branch identity are byte arrays, further comprising:

converting the global identity and the branch identity byte arrays into a format for storage in an event table; wherein the event table is stored by the enterprise information system; and storing the converted global identity and the branch identity into the event table.

9. A data processing system for assured event delivery in an enterprise information system, the data processing system comprising:

a storage device, wherein the storage device stores computer usable program code; and a processor, wherein the processor executes the computer usable program code to map the capabilities of the enterprise information system onto an interface, wherein the mapping allows the enterprise information system to be used in global transactions, wherein the interface is an interface for a resource adapter, wherein the interface associates a unique transaction identity with an event, and wherein the event is a change that has occurred within the enterprise information system to be propagated into another system; and poll between the enterprise information system and a client system, wherein the polling delivers a set of events;

determining whether the event has been delivered to the client system;

responsive to the event having been delivered to the client system, performing a commit method for the event, wherein the commit method informs the resource adapter that the event was delivered; and responsive to the event failing to be delivered to the client system, performing a rollback method for the event, wherein the rollback method informs the resource adapter that the transaction was not completed.

* * * * *